INVENTOR.
PHILIP C. MILLER
BY
HIS ATTORNEYS

United States Patent Office 3,161,836
Patented Dec. 15, 1964

3,161,836
PULSING CIRCUIT
Philip C. Miller, Dayton, Ohio, assignor to Ledex, Inc., Dayton, Ohio, a corporation of Ohio
Filed Nov. 3, 1960, Ser. No. 67,047
11 Claims. (Cl. 331—112)

This invention relates to a pulsing circuit and more particularly to a circuit for periodically energizing a solenoid coil or the like; however, the invention is not necessarily so limited.

The present application is a continuation-in-part of my copending application, Serial No. 851,786, filed November 9, 1959, and now abandoned, for a Pulse Generating Apparatus. In this copending application, a pulsing circuit is shown wherein a single transistor element is placed in series with a solenoid coil and a voltage supply. The base circuit of the transistor is controlled to give a pulsing action by means of an inductive feedback connection to the solenoid coil. This type of circuit has proved useful for energizing electromagnetically powered stepping devices such as disclosed in copending application, Serial No. 726,943, filed April 7, 1958, by Gerald H. Leland et al. for a Rotary Stepping Motor, and now Patent No. 2,959,969.

In simple pulsing circuits of this type, the time duration of each pulse delivered to the solenoid coil is limited by the current carrying capacity of the transistor element. In consequence of this limitation, it is sometimes not possible to obtain a single transistor element which can efficiently serve a given stepping motor throughout the entire range of operating conditions for which the stepping motor is designed. In other words, situations can occur wherein a transistor element otherwise suitable for use in pulsing a stepping motor has inadequate current carrying capacity to provide a pulse of sufficient time duration to carry the stepping motor through its operating cycle under heavy loads.

The primary object of the present invention is to provide a novel, compact pulsing circuit for supplying power to a solenoid or the like.

Another object of this invention is to provide an improved pulsing circuit having a longer time duration for the pulses delivered than is obtained with simple one-transistor circuits.

Another object of this invention is to provide a pulsing circuit comprising only solid state components operable to produce intermittent essentially periodic pulses from a suitable source of electrical power.

A further object of this invention is to provide a circuit for energizing an inductance coil, including a control responsive to current flow in the inductance coil for regulating the operation of this circuit.

Another object of the invention is to provide a novel pulse generating circuit which has a relatively long and reliable operating life and which produces a low order of RF interference.

Other objects and advantages reside in the construction of parts, the combination thereof, the method of manufacture and the mode of operation, as will become more apparent from the following description.

Figure 1:
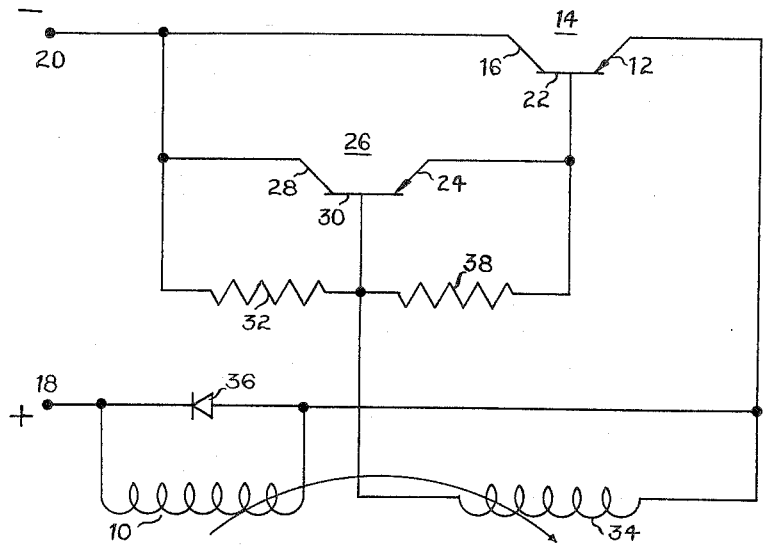
FIGURE 1 is a circuit diagram of one embodiment of a pulsing circuit in accordance with this invention.

Referring to the drawing in greater detail, reference numeral 10 in FIGURE 1 designates a solenoid coil. When the pulsing circuit of this invention is to be used to energize a stepping motor, the solenoid coil 10 may be associated with a suitable armature, not shown, for producing mechanical power in the stepping motor. One end of this coil is connected to the positive side 18 of a suitable direct current power supply, and the opposite end of this coil is connected to the emitter 12 of a p-n-p transistor element 14. The collector 16 of the transistor element 14 connects to the negative side 20 of the power supply.

The base 22 of the transistor element 14 connects to the emitter 24 of a second transistor element 26 and the collector 28 of this transistor element 26 connects to the negative side of the power supply. The base 30 of the transistor element 26 connects through a resistance 32 to the collector 28 and the negative side of the power supply.

With this circuit arrangement, the application of a potential between the positive and negative terminals 18 and 20 will induce a current to flow through the coil 10, the emitter to base section of the transistor element 14, the emitter to base section of the transistor element 26 and the resistance 32 to the negative side of the power supply. This initial current flow in the base sections of the transistors 14 and 26 renders each of the transistors conductive between their emitters and collectors, thus permitting an increasing current flow through the coil 10.

A second coil 34 is inductively coupled to the coil 10. In the preferred embodiment, the coil 34 is assembled adjacent the coil 10 in the stepping motor unit. This coil is connected between the emitter 12 of the transistor element 14 and the base 30 of the transistor element 26 such that an increasing current flow in the coil 10 is fed back through the coil 34 to produce enhanced base currents in the transistor elements 14 and 26. As a result of this feedback, the transistor elements are rendered highly conductive in an extremely short time interval. During the time that both transistor elements are conductive, the current passing through the coil 10 divides so that one portion passes to the collector 16 of the transistor element 14 and the balance passes through the base section of the transistor element 14 to the emitter 24 and collector 28 of the transistor element 26. Preferably, the circuit constants are adjusted so that the combined current carrying capacity of the two transistor elements exceeds the steady state current which will be passed by the coil 10 at the particular voltage applied.

As the coil 10 approaches a steady state condition, the feedback through the coil 34, which biases the transistor elements 14 and 26, reduces to a point where the base currents in the two transistors are insufficient to support the total current flowing through the coil 10. This causes a reduction in the current flowing through the coil 10, reversing the feedback polarity through the coil 34, and thereby reversing the bias on the transistor elements 14 and 26. As a result, the collector currents in these two transistor elements are extinguished. At this time, the coil 10 discharges through a diode 36 which is across the coil. The time for this discharge depends upon the resistance in the diode circuit which, if need be, may be adjusted by the addition of a resistance element in series with the diode. It will be understood, of course, that the element 36 may be any suitable resistance element.

During the time the coil 10 discharges, the reverse feedback through the coil 34 holds the transistor elements 14 and 26 in a nonconducting state. The discharge continues until forward current flow in the base sections of the transistors 14 and 26 through the resistance 32 overcomes the negative feedback to initiate a new cycle of operation. This cycle will be repeated indefinitely so long as potential is applied between the terminals 18 and 20.

Due to the fact that the emitter to base sections of the transistor elements 14 and 26 are effective diodes, a resistance element as shown at 38, or its equivalent, is needed to stabilize the circuit during the time a negative bias is applied to the transistors by means of feedback through the coil 34. Absent the resistance element 38, the base-emitter diode in the transistor element 26 will shield the transistor element 14 from the negative bias with the result that there will be a high power loss in the transistor element 14. With the resistance element 38 connected between the base and emitter of the transistor element 26 as shown, a portion of the negative bias is bypassed to the base section of the transistor element 14, keeping this transistor element in current cut-off, and thereby materially reducing the power loss through the transistor element 14. This thermally stabilizes the circuit.

Utilizing 2N1038 transistor elements, a 1N2069 diode at 36, an 8200 ohm resistance 32, and a 332 ohm resistance 38, a solenoid coil 10 comprising 55 turns of No. 27 wire coupled to a feedback coil 34 comprising 500 turns of No. 40 wire, the circuit will cycle at approximately 10 cycles per second under an applied potential of 28 volts. In this cycle, the time duration of each current pulse; i.e., the time during which the transistor elements 14 and 26 are conductive, is approximately 45 milliseconds.

In my copending application, Serial No. 851,786, referred to hereinbefore, only the transistor element 14 is utilized and the feedback coil 34 is connected directly between the emitter and base sections of that transistor. Using comparable circuit components, it is found that this single transistor circuit, adjusted to operate at substantially the same frequency, produces pulses having a time duration of only approximately 17 milliseconds. Thus, the addition of the second transistor element 26 in the circuit disclosed increases the approximate time duration of the pulses produced from 17 milliseconds to 45 milliseconds.

Figure 2:
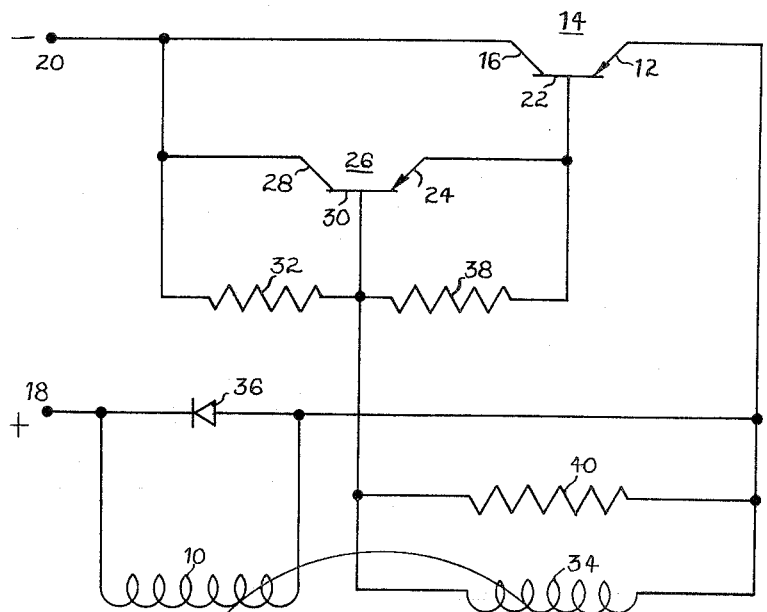
FIGURE 2 is a diagram of a modified circuit.

The modified circuit of FIGURE 2 includes a resistance element 40 across the feedback coil 34. This resistance element has the effect of partially shunting the negative bias applied by the feedback coil 34, thereby reducing the negative bias on the transistor elements 14 and 26. The effect of this reduction in bias is to reduce the extent to which the coil 10 must discharge before the forward biasing current through the resistance 32 overcomes the reverse bias on the transistor elements. This, in turn, results in a reduced time duration for each pulse. By proper selection of the resistance element 40, the time duration of pulses produced may be preselected as desired.

Although the preferred embodiments of the device have been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A circuit for producing intermittent electrical pulses through an inductive load comprising a first transistor having a collector, a base and an emitter, voltage supply terminals adapted for connection to a voltage source, means connecting said voltage supply terminals and said load in series relation with the emitter-to-collector circuit of said first transistor, a second transistor having a collector, a base and an emitter, means connecting the emitter of said second transistor with the base of said first transistor, means interconnecting the collectors of said transistors, means providing an external control current path between the emitter of said first transistor and the base of said second transistor, and means responsive to increasing and decreasing current flow through said load for increasing and decreasing respectively current flow in said external current path.

2. A circuit for producing intermittent pulses through a first inductance coil comprising a transistor having a collector, a base and an emitter, a voltage supply, means connecting said voltage supply and said coil in series relation between said emitter and said collector, a second transistor having a collector, a base and an emitter, means connecting the emitter of said second transistor with the base of said first transistor, means interconnecting the collectors of said transistors, and means providing a current path between the emitter of said first transistor and the base of said second transistor, said last named means including a second inductance coil responsive to current flow in said first coil.

3. The circuit according to claim 2 including a shunt across said first coil comprising a rectifier oriented to oppose current flow through said shunt in the same direction as current flow through the emitter-to-collector circuits of said transistors.

4. The circuit according to claim 2 including a resistance element and means connecting said resistance element between the emitter and the base of said second transistor.

5. The circuit according to claim 2 including a resistance element and means connecting the resistance element between the collector and the base of said second transistor.

6. The circuit according to claim 2 including a resistance element and means connecting the resistance element across said feedback coil.

7. A circuit for producing intermittent pulses through an inductance coil comprising a first transistor having an emitter, a base, and a collector, a voltage supply, means connecting said voltage supply and said coil in series relation between the emitter and collector of said first transistor, a second transistor having an emitter, a base and a collector, means connecting the emitter of said second transistor with the base of said first transistor, means interconnecting the collectors of said transistors, means furnishing a current path between the base of said second transistor and the emitter of said first transistor, means responsive to current flow through said coil for controlling current flow in said current path, and means connected in shunting relation with said coil for dissipating energy stored therein whenever the transistors are essentially nonconducting between their respective emitters and collectors.

8. A circuit for producing intermittent pulses through an inductance coil comprising a first transistor having an emitter, a base, and a collector, voltage supply terminals, means connecting said voltage supply terminals and said coil in series relation between said emitter and said collector, a second transistor having an emitter, a base and a collector, means connecting the emitter of said second transistor with the base of said first transistor, means interconnecting the collectors of said transistors, means providing a current control path between the base of said second transistor and the emitter of said first transistor, means responsive to an increasing current flow through said coil for causing current flow in said control path in a direction from the emitters to the bases of said transistors, and means connected in shunting relation with said coil for discharge thereof whenever the transistors are essentially nonconducting between their respective emitters and collectors.

9. A circuit according to claim 8 including a resistance element, and means connecting said resistance element between the emitter and the base of said second transistor.

10. Apparatus for generating a pulsating unidirectional electromotive force comprising the combination of an inductance coil, power supply terminals connected to said coil to pass electrical current therethrough and induce an E.M.F. in the area surrounding said coil, a transistor having a base, a collector, and an emitter, means connecting the emitter-to-collector circuit of said transistor in series relation with said inductance coil and said power supply terminals to provide controlled application of a driving current to said coil, a second transistor having a base, a collector, and an emitter, means connecting the emitter of said second transistor with the base of said first transistor, means interconnecting the collectors of said transistors, means inductively coupled to said inductance coil for generating a flow of control current in response to passage of a changing electrical current through said inductance coil, and means connecting said control current generating means in series relation with the emitter of said first transistor and the base of said second transistor for passing the control current flow through the emitter-to-base circuits of said transistors and thus facilitating current flow through the emitter-to-collector circuits of said transistors only in response to flow of driving current in a predetermined direction through said inductance coil.

11. A circuit for producing intermittent pulses through an inductance coil, a first transistor having an emitter, a base, and a collector, voltage supply terminals, means connecting said terminals and said coil in series relation with the emitter to collector circuit of said transistor, a second transistor having an emitter, a base, and a collector, means connecting the emitter of said second transistor with the base of said first transistor, means interconnecting the collectors of said transistors, means providing an external control current path between the base of said second transistor and the emitter of said first transistor, and a feedback coil mounted in flux linked relation with said inductance coil and connected to pass a flow of current induced therein through said external control current path to induce current flow in the emitter-to-base circuits of said transistors only in response to an increasing flow of current through said inductance coil.

References Cited in the file of this patent
UNITED STATES PATENTS

| | | |
|---|---|---|
| 2,897,431 | Wolfendale | July 28, 1959 |
| 2,942,123 | Schuh | June 21, 1960 |
| 2,957,145 | Bernstein | Oct. 18, 1960 |

OTHER REFERENCES

Bohr: "Sensitive Relay Circuits," Radio Electronics, January 1958, pp. 112, 114, 115.